(12) United States Patent
Sandstad

(10) Patent No.: US 10,918,094 B2
(45) Date of Patent: Feb. 16, 2021

(54) FLOATING FISH FARMING PLANT AND ASSEMBLY OF PLANTS

(71) Applicant: SEAFARMING SYSTEMS AS, Stavanger (NO)

(72) Inventor: Alf Reidar Sandstad, Stavanger (NO)

(73) Assignee: SEAFARMING SYSTEMS AS, Stavanger (NO)

( * ) Notice: Subject to any disclaimer, the term of this patent is extended or adjusted under 35 U.S.C. 154(b) by 178 days.

(21) Appl. No.: 16/092,736

(22) PCT Filed: Apr. 4, 2017

(86) PCT No.: PCT/NO2017/050080
§ 371 (c)(1),
(2) Date: Oct. 10, 2018

(87) PCT Pub. No.: WO2017/179989
PCT Pub. Date: Oct. 19, 2017

(65) Prior Publication Data
US 2019/0166808 A1 Jun. 6, 2019

(30) Foreign Application Priority Data

Apr. 11, 2016 (NO) .................................. 20160587
Jul. 5, 2016 (NO) .................................. 20161121

(51) Int. Cl.
*A01K 61/60* (2017.01)
*A01K 61/10* (2017.01)

(52) U.S. Cl.
CPC .............. *A01K 61/60* (2017.01); *A01K 61/10* (2017.01); *Y02A 40/81* (2018.01)

(58) Field of Classification Search
CPC ....... A01K 61/10; A01K 61/60; Y02A 40/826
(Continued)

(56) References Cited

U.S. PATENT DOCUMENTS

| 4,084,543 A | * | 4/1978 | Pequegnat | ............. | A01K 61/60 |
| | | | | | 119/200 |
| 4,890,413 A | * | 1/1990 | Nelson | ................... | A01K 97/20 |
| | | | | | 43/55 |

(Continued)

FOREIGN PATENT DOCUMENTS

| EP | 0 347 489 A2 | 12/1989 |
| NO | 165901 B1 | 5/1989 |

(Continued)

OTHER PUBLICATIONS

Berge, Aslak, Full English Machine Translation of previously cited article "MNH—Produksjon søker om åtte utviklingskonsesjoner", Cited Oct. 10, 2018, Translation accessed on Jan. 15, 2019, URL: https://translate.google.com/translate?hl=en&sl=no&u=https://ilaks.no/mnh-produksjon-soker-om-atte-utv.

(Continued)

*Primary Examiner* — Christopher D Hutchens
*Assistant Examiner* — Brady W Frazier
(74) *Attorney, Agent, or Firm* — Arent Fox, LLP

(57) ABSTRACT

A floating fish farming plant including a cage supported by a buoyant body which is configured for floating in a body of water. The farming plant further includes a lifting portion arranged between the buoyant body and the cage and configured for moving the cage between a position at the level of, or below, the buoyant body and a position in which at least a portion of the cage is above the buoyant body. The cage includes at least a lower section, forming a bottom portion of the cage, said lower section having a wall comprising an elastic material and/or being elastically connected to the middle sections; whereby transfer of dynamic forces between the lower section and the adjoining section is reduced. An assembly comprises a plurality of fish farming plants.

6 Claims, 15 Drawing Sheets

(58) Field of Classification Search
USPC .................. 119/223, 224, 226, 228
See application file for complete search history.

(56) References Cited

U.S. PATENT DOCUMENTS

| | | | | |
|---|---|---|---|---|
| 5,549,076 | A * | 8/1996 | Kaarstad | A01K 61/60 119/223 |
| 5,845,602 | A * | 12/1998 | Kaarstad | A01K 61/60 119/223 |
| 5,967,086 | A * | 10/1999 | Knott, Sr. | A01K 61/60 119/223 |
| 6,216,635 | B1 * | 4/2001 | McRobert | A01K 61/60 119/201 |
| 2008/0035070 | A1 * | 2/2008 | Harrison | A01K 61/60 119/223 |
| 2010/0224136 | A1 * | 9/2010 | Papadoyianis | A01K 61/60 119/223 |
| 2011/0174232 | A1 * | 7/2011 | Hoie | A01K 61/60 119/223 |
| 2012/0167829 | A1 * | 7/2012 | Madsen | A01K 61/60 119/223 |
| 2013/0112151 | A1 * | 5/2013 | Mizrachi | A01K 61/60 119/223 |
| 2015/0083050 | A1 * | 3/2015 | Brosh | A01K 61/00 119/200 |
| 2015/0150223 | A1 * | 6/2015 | Robinson | A01K 63/047 119/223 |
| 2015/0272018 | A1 * | 10/2015 | Menard | A01K 61/60 119/223 |
| 2016/0100560 | A1 * | 4/2016 | Dornbierer | A01K 61/60 119/223 |
| 2016/0330943 | A1 * | 11/2016 | Egge | A01K 61/90 |

FOREIGN PATENT DOCUMENTS

| | | |
|---|---|---|
| NO | 336739 B1 | 12/1989 |
| NO | 20042778 | 6/2004 |
| NO | 321069 B1 | 3/2006 |
| NO | 334957 B1 | 8/2014 |
| WO | 87/04320 A1 | 7/1987 |
| WO | WO 87/04319 A1 | 7/1987 |
| WO | WO 2006/004415 A1 | 1/2006 |
| WO | WO 2010/050825 A1 | 5/2010 |
| WO | WO 2014/189383 A1 | 11/2014 |
| WO | WO 2016/039632 A1 | 3/2016 |

OTHER PUBLICATIONS

Botngård, Knut, "Permaskjrørt, hindrer påslag av lus" (with Partial English Machine Translation), Norsk Fiskeoppdrett, Apr. 2014, URL: http://www.botngaard.no/Files/5a0b7a8e-8dd8-4aa2-97d5-b2b947b92d8b_Artikkel-permaskjort.pdf.
Norwegian Search Report dated Apr. 19, 2018 issued in corresponding Norwegian Application No. 20172017.
Norwegian Search Report dated Dec. 8, 2016 issued in corresponding Norwegian Application No. 20161121.
Norwegian Search Report dated Sep. 8, 2016 issued in corresponding Norwegian Application No. 20160587.
European Search Report issued for corresponding EP Application 17782720.1 dated Nov. 7, 2019.
Berge, Aslak, "MNH—Produksjon søker om åtte utviklingskonsesjoner", iLaks, Apr. 12, 2016, URL: hptt://ilaks.no/mnh-produksjon-soker-om-atte-utviklingskonsesjoner/, Whole Document.
International Search Report and Written Opinion dated Jun. 16, 2017 issued in International Application No. PCT/NO2017/050080.

* cited by examiner

FLOATING FISH FARMING PLANT AND ASSEMBLY OF PLANTS

CROSS-REFERENCE TO RELATED APPLICATIONS

This application is a 35 U.S.C. § 371 National Phase of PCT Application No. PCT/NO2017/050080 filed Apr. 4, 2017, which claims priority to Norwegian Application No. NO 20160587 filed Apr. 11, 2016 and Norwegian Application No. NO 20161121 filed Jul. 5, 2016. The disclosures of these prior applications are hereby incorporated by reference herein.

FIELD OF THE INVENTION

The invention concerns a floating fish farming plant as defined in the preamble of claim 1, and an assembly of fish farming plants.

BACKGROUND OF THE INVENTION

Floating fish farming plants have been known for a long time. The prior art includes WO 2006/004415 A1 (corresponding to Norwegian patent application No. 20042778), which describes a container for location in the sea for collection of fluids, masses or mixtures of objects and fluids, with a specific weight which is not substantially different from seawater, with a cylindrical shape and arranged for location with the longitudinal axis in vertical direction, and where its sidewalls are assembled of sheet elements which are joined along their side edges forming a shell construction.

SUMMARY OF THE INVENTION

The invention is defined and characterized in the independent claim, while the dependent claims define other characteristics of the invention.

It is thus provided a floating fish farming plant, comprising a cage supported by a buoyant body which is configured for floating in a body of water; characterized by lifting means arranged between the buoyant body and the cage and configured for moving the cage between a position at the level of, or below, the buoyant body and a position in which at least a portion of the cage is above the buoyant body.

The lifting means may be fixedly connected to the buoyant body and movably connected to the cage, or vice versa.

In one embodiment, the cage comprises at least a lower section, forming a bottom volume of the cage, said lower section at least partially being elastically connected to an adjoining section (6b) of the cage, whereby transfer of dynamic forces between the lower section and the adjoining section is reduced.

In one embodiment, said lower section comprises a wall comprising an elastic material; whereby at least a portion of the lower section may alter its shape under the influence of external forces. Such external forces may for example be generated by water currents or waves when the plant is installed in a body of water.

In one embodiment, the cage comprises at least an upper section and a middle section, said sections comprising walls of a rigid material, such as metal plates, fibre-glass plates, or polyethylene plates; said walls being impermeable to water.

In one embodiment, the cage comprises at least an upper section and a middle section, said sections comprising walls of a rigid material, such as metal plates of fibre-glass plates; said walls at least partly allowing water through-flow but provides a barrier for the fish inside the cage.

In one embodiment, the middle section comprises at least one portion which allows fluid flow but provides a barrier for the fish inside the cage.

The lower section may be movable and selectively lockable inside at least the middle section and the upper section, whereby the lower section may be moved between a bottom position below the middle section, and a top position in which the upper region of the lower section is at the level of the upper region of the upper section, and wherein the lower section may be locked in said top position, said bottom position and in any intermediate position.

In one embodiment, the buoyancy body comprises a buoyancy ring.

The fish farming plant may comprise an elastic connection member between the lower section and the adjoining section. The lower section may be telescopically connected to the adjoining section.

The lower section may comprise a plurality of members interconnected via elastic members. Such members may comprise perforated plates or a steel net.

It is also provided an assembly of a plurality of the invented fish farming plants, characterized in that the buoyant body comprises at least one hull. The assembly may comprise a plurality of hulls, interconnected by structural members; said hulls and structural members supporting said plants.

The plant and the assembly of plants may be moored in a per se known method, for example by means of lines, wires or chains between the buoyancy ring and anchors on the seabed. Mooring may also be accomplished by means of a turret connection, allowing the plant or assembly of plants to weathervane.

The plant may comprise a semi-closed, open, or closed steel cage, built according to ship-building principles, i.e.
  Rigid, steel, buoyancy ring,
  Stiff, robust, and stable, structure,
  Closed, stiff, wall in the upper section, which prevents ingress of lice,
  Stiff walls (preferably made of steel) that are not deformable in the same manner as the walls of a conventional cage,
  Active circulation of water, which is pumped from deeper down in the body of water and into the cage, provides improved water quality and contributes to expelling faeces and other waste products from the cage,
  An integrated cage purging method; emptying the cage from the bottom, utilising the natural behaviour-pattern for the fish.

The plant may utilize a stiff fish farming cage which is developed to utilize the naturally favourable conditions for fish farming along the coast of Norway. The structure may comprise a circular buoyancy ring of steel, with the stiff cage inside. The upper part may be built of impermeable plates, while the rest of the structure may have perforated, or vented, sections, allowing water flow but retain the fish. The cage is connected to the buoyancy ring via a plurality (preferably at least three) lifting columns which makes it possible to elevate the cage entirely out of the water. The lifting columns may have internal ducts (not shown) whereby clean water from water depths below the column may be fed to the upper section of the cage. The water flow will induce a circular water current in the cage, such that water is expelled from the cage, through the perforated, or vented, sections.

Crowding and emptying of fish from the cage may be effectuated by lifting the cage while the fish is pumped out of the cage via a bottom, emptying, hose. Emptying fish from the cage may also be effectuated by raising the movable lower section inside the cage. The cage and the movable lower section may be moved (lifted) separately or simultaneously. This operation is performed in a gentle and efficient manner, utilizing the natural behavioural pattern of the fish. For disinfection, the cage may be lifted entirely out of the water, and cleaned and disinfected by means of drying and/or freezing.

BRIEF DESCRIPTION OF THE DRAWINGS

These and other characteristics of the invention will become clear from the following description of embodiments, given as non-restrictive examples, with reference to the attached drawings, wherein:

FIG. 33b shows the section F-F in FIG. 33a. FIG. 33c is a perspective view of the embodiment illustrated in FIG. 33a.

FIG. 34b shows the section E-E in FIG. 34a. FIG. 34c is a perspective view of the embodiment illustrated in FIG. 34a.

FIG. 35 shows the elastic lower section in a convex position.

FIG. 46a shows the elastic lower section in a concave position.

FIG. 46b illustrates the section I-I in FIG. 46a.

FIG. 48b illustrates the section J-J in FIG. 48a.

FIG. 50a shows the elastic lower section in a concave position.

FIG. 50b illustrates the section K-K in FIG. 50a.

DETAILED DESCRIPTION OF EMBODIMENTS

Figure 1:
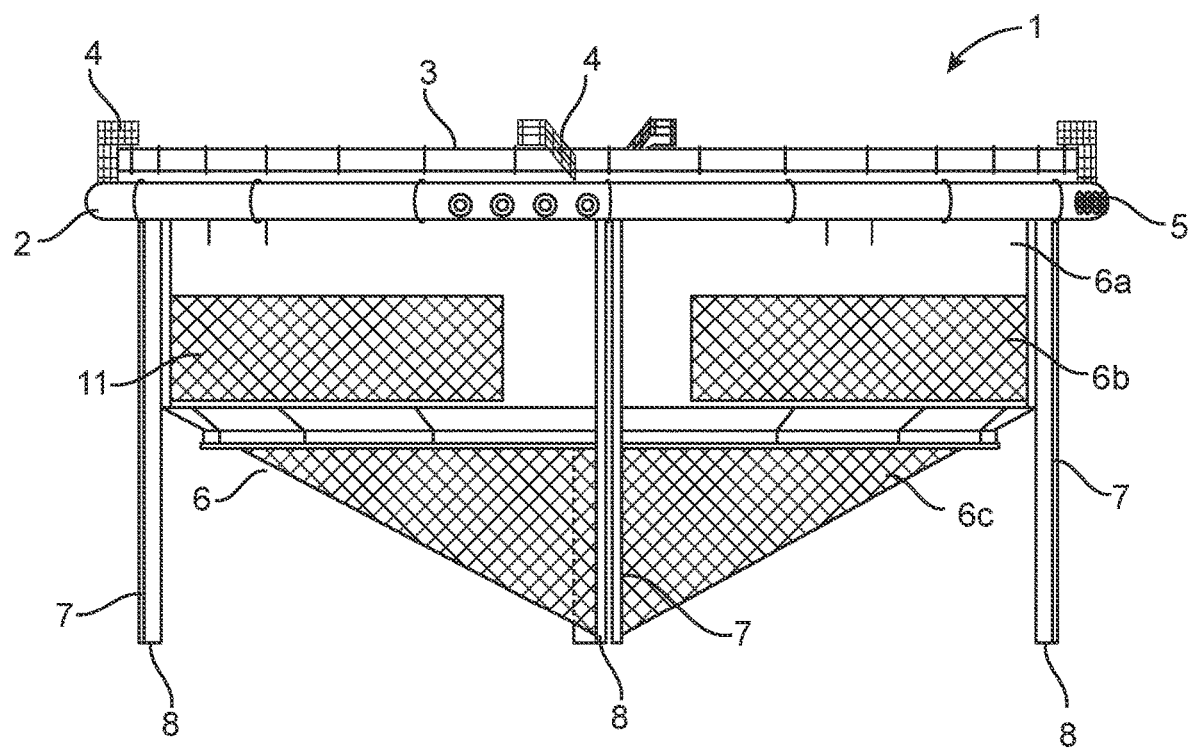
FIG. 1 is a side view of an embodiment of the plant according to the invention.

The following description may use terms such as "horizontal", "vertical", "lateral", "back and forth", "up and down", "upper", "lower", "inner", "outer", "forward", "rearward", etc. These terms generally refer to the views and orientations as shown in the drawings and that are associated with a normal use of the invention. The terms are used for the reader's convenience only and shall not be limiting.

Figure 2:
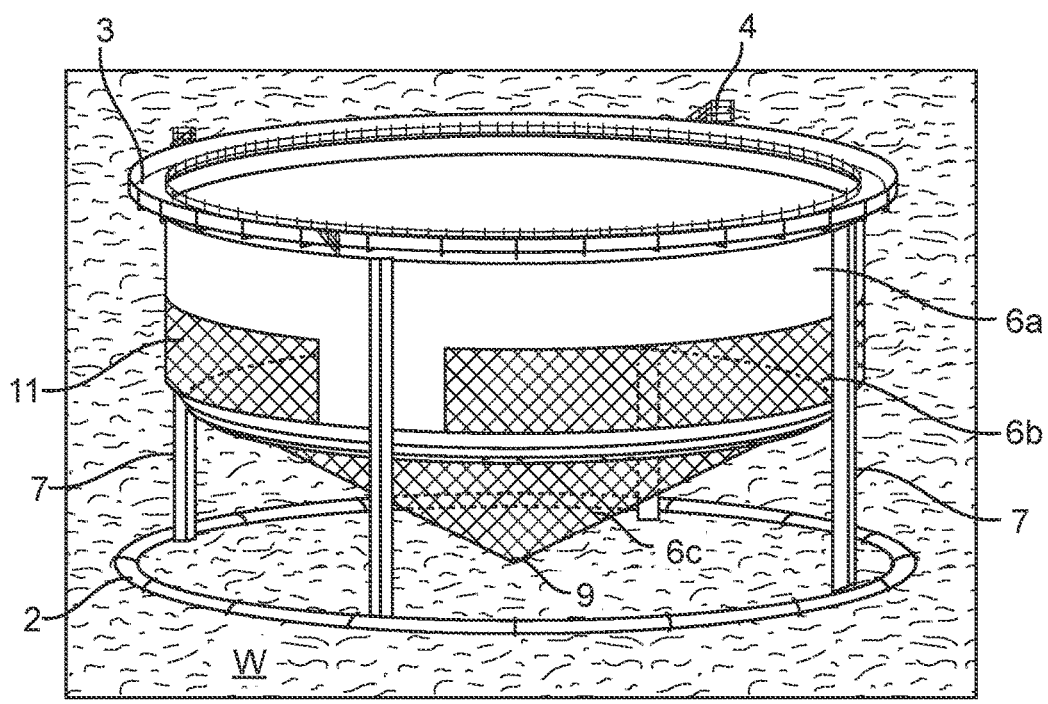
FIG. 2 is a perspective drawing of the plant illustrated in FIG. 1, floating in a body of water and where the cage is elevated above the water surface.

Referring initially to FIG. 1 and FIG. 2, the floating plant 1 comprises in the illustrated embodiment a cylindrical cage 6 which is connected to lifting columns 7, and may be elevated and lowered relative to a buoyancy ring 2. The cage 6 and lifting columns 7 are connected to an upper ring 3 which also serves as a gangway. The buoyancy ring is furnished with fenders 5, access ladder 4 and handrails. The means for moving (i.e. lowering and raising) the lifting columns 7 (and hence the cage 6) may be a wire-and-winch configuration, a rack-and-pinion assembly, or other suitable devices known in the art.

The buoyancy ring 2 is a stiff structure, preferably composed of interconnected (bolted, welded, etc.) watertight sections, whereby it may withstand wave forces and impact forces from ships. Suitable materials for the buoyancy ring comprise steel, aluminium, fibre-glass, polyethylene (for example high-density polyethylene). In the illustrated embodiment, the floating plant has four lifting columns 7, but the invention shall not be limited to this number. At least three lifting columns are considered to be necessary. Each of the vertical lifting columns may be provided with rungs (not shown).

The circular cage 6 is preferably made of a predominantly stiff material (e.g. steel), and comprises three main sections. In the embodiment illustrated in FIG. 1, the sections are:
 a) An upper section 6a with an impermeable, cylindrical, wall (of e.g. impermeable plates).
 b) A middle section 6b, having a cylindrical wall with "fluid windows" 11; said fluid windows being covered with a structure such as grating, wire screen, perforated plates, etc., or other material that is configured and dimensioned such that water may flow through the window, but prevent the farmed fish from escaping.
 c) A lower section 6c having a funnel-shaped wall which in the illustrated embodiment is open, but it may also be closed or partly closed. The lower section 6c also comprises a connection point 9 for a hose, the purpose of which will be explained below.

It should be understood that the term "open" in the context of the section wall (e.g. as used in item c above), shall mean a wall which comprises a structure that allows water to pass through, but is configured and dimensioned such that the farmed fish may not pass through. Suitable "open-wall" structures comprise grating, wire screen, nets, and perforated plates. It should also be understood that the term "closed" in the context of the section wall, shall mean a wall which comprises a structure that is impermeable to water, fish and lice. Suitable "closed-wall" structures comprise in the illustrated embodiment plates made of metal (steel, aluminium) or fibre-glass plates. Other, suitable, materials may comprise polyethylene, for example high-density polyethylene. It should also be understood, as will be described below, that the middle and lower sections may have other configurations.

In one embodiment, the upper section 6a vertical dimension may be 5 metres. This will ensure that inflow and outflow of water (natural, passive, water exchange) between the cage and the surrounding sea W takes place below the depth level where lice normally is present (i.e. below a depth of 5 to 6 metres). The vertical dimension of the middle section 6b may also be for example 5 metres, and the vertical dimension of the lower section may be for example 10 metres. However, the three sections may have other dimensions, and the invention shall not be limited to the above mentioned dimensions.

In addition to the passive water exchange through the perforated wall and bottom of the cage, the plant comprises in addition devices for mechanical water supply. A submergible pump (not shown) is arranged in the lower end of each of the four vertical lifting columns and connected to water intakes 8, such that internal pipes feed seawater (se FIG. 1) and convey the water to four directional nozzles which provides water circulation inside the cage. The internal pipes may be supplemented by additional flexible hoses (not shown).

Water intake from greater depths (i.e. the lower ends of the lifting columns) results in a more stable temperature in the cage, and reduces the stress levels for the fish. Temperature fluctuations are somewhat reduced, which to some extent may reduce stress. It provides a possibility for increasing the water temperature in the cage during the winter and to lower it on hot summer days, as needed. This ability to control the cage water temperature, will significant improve the growth and hence reduce the production time.

An improved growth rate is also anticipated, as the temperature is decreased. During normal operations (with the pumps running), there will be a net outflow from the cage, through the windows 11. When the pumps are not running, the water exchange will be governed by the sea currents.

The plant is modular, which makes fabrication in low-cost countries and assembly at the intended operation site possible, without the need for expensive assembly equipment. The plant in the illustrated embodiment is circular, and may be moored in a manner similar to prior art ring-shaped plants. Additional infrastructure is therefore not required. The invention shall, however, not be limited to these geometries. Therefore, the term "buoyancy ring" shall be understood to mean any buoyancy body which supports the cage 6, irrespective of geometry.

Figure 3:
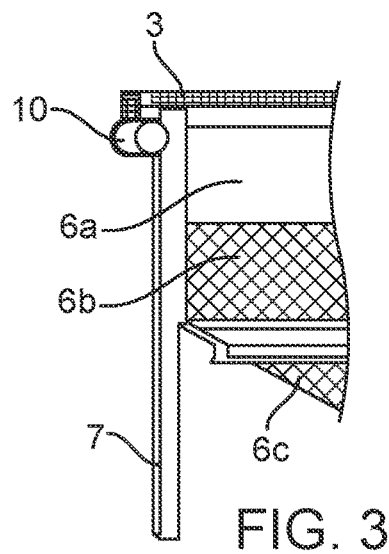
FIG. 3 is a part-sectional drawing of the plant as seen from a side, and illustrates an embodiment of a lifting system for the cage.

In the embodiment illustrated in FIG. 3, the cage can be moved with respect to the buoyancy ring (and hence lifted out of the water) by means of four synchronized winches. Each winch is connected to a chain (or similar) which runs to the bottom of the lifting columns. Other lifting devices may be used. The cage can also be lifted entirely out of the water W, as illustrated in FIG. 2. Other lifting means than those described here are conceivable. Power supplies, control systems and other means required to operate the plant, are not illustrated, as these means are considered to be known in the art.

The cage 6 may be moved up or down in the water (by moving/sliding the lifting columns relative to the buoyancy ring), thereby ensuring that the cage is maintained at the desired level in the body of water. This may be performed via manual control and operations, or by means of automated, sensor-based, devices (not shown). The cage 6 may also be fixed in position by means of e.g. a total of eight locking bolts (not shown), two per lifting column, into the buoyancy ring, or any other known locking devices.

Figure 4:
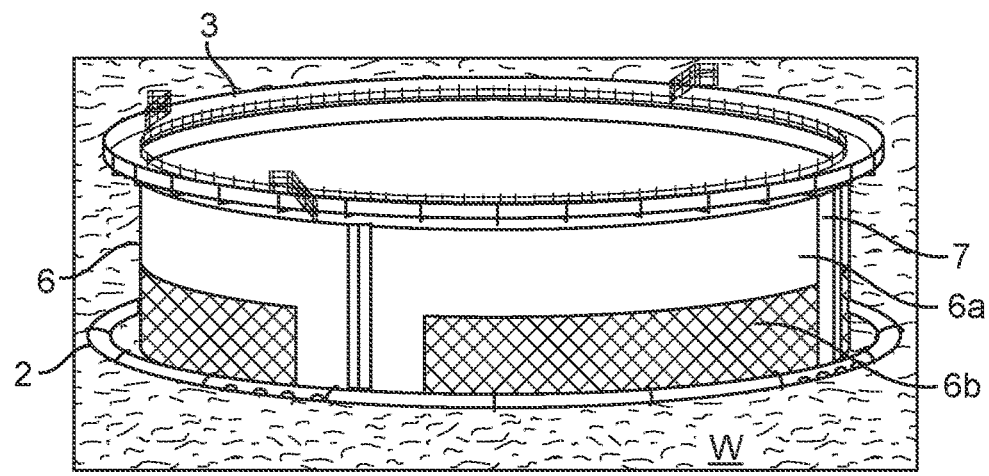
FIG. 4 illustrates the cage shown in FIG. 2, but where the cage is partially lowered into the body of water.
Figure 5:
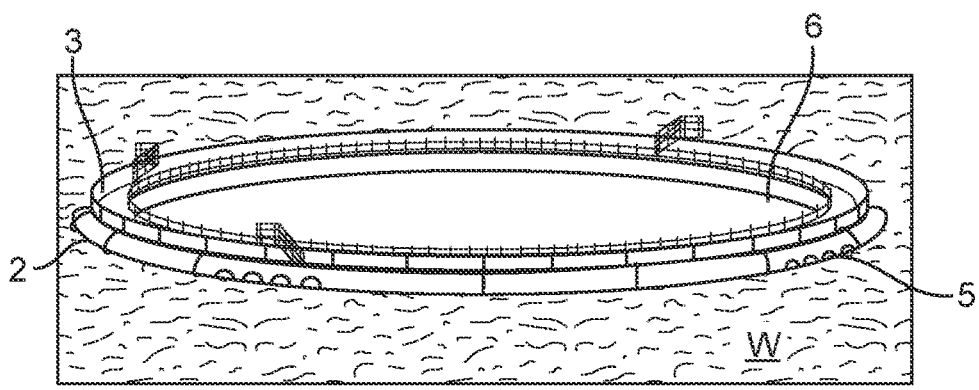
FIG. 5 illustrates the cage as shown in FIG. 4, but where the cage is lowered completely into the body of water.

FIG. 4 shows the cage 6 in a partially lowered position, i.e. approximately half-way between fully raised and fully lowered, and FIG. 5 shows the cage 6 in a fully lowered position, in which only the top ring 3 is above water.

Figure 6:
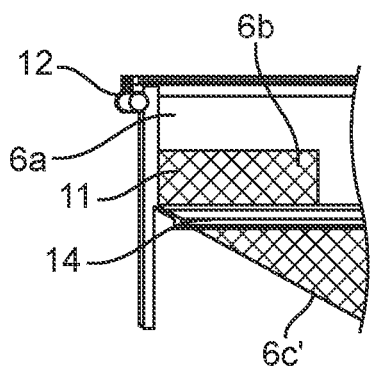
FIG. 6 illustrates a section of the plant as viewed form a side, and illustrates an embodiment in which the lower section is liftable (movable) inside the cage, and an embodiment of a lifting system for the movable lower section.

Referring now to FIG. 6, in one embodiment, the cage lower section 6c' may in one embodiment be configured such that it may be moved (e.g. elevated) inside—and all the way to the top of—the cage 6. The movable (liftable) lower section 6c' is in the illustrated embodiment connected to a circular ring 14 (of e.g. polyethylene; PE) which in normal operation rests on the stiff transition at the lower region of the middle section 6b. The movable lower section 6c' may be elevated by means of synchronised winches 12 and may be raised all the way to the top of the cage 6, i.e. to the upper edge of the upper section 6a. Other lifting means are conceivable.

Figure 7:
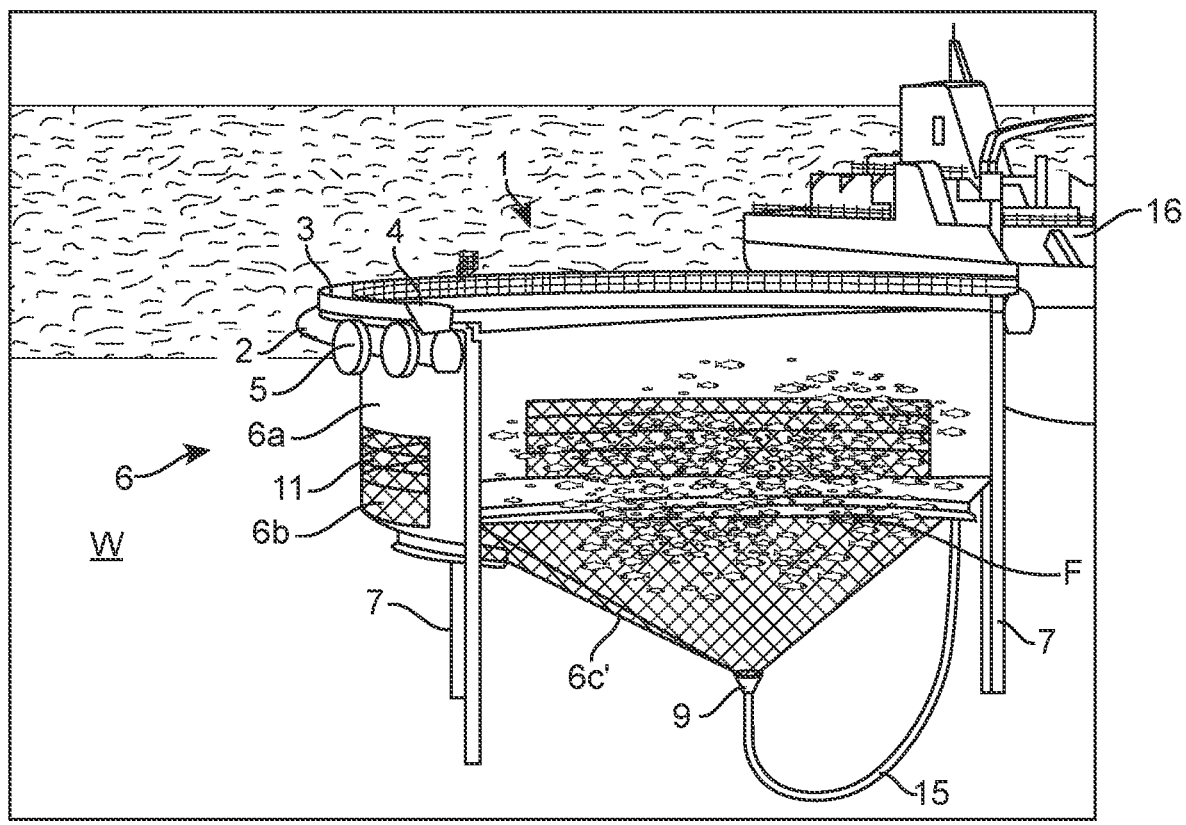
FIG. 7 is a perspective view of an embodiment of the plant according to the invention, lowered into a body of water.

In FIG. 7, the plant is shown in operation in a body of water W. The cage 6 is at its fully lowered position (i.e. with respect to the buoyancy ring 2), and the movable lower section 6c' is also at its fully lowered position. Fish F are contained within the cage 6, and a hose 15 is connected between the connection point 9 and a ship 16 (e.g. a wellboat) alongside the plant.

Figure 8:
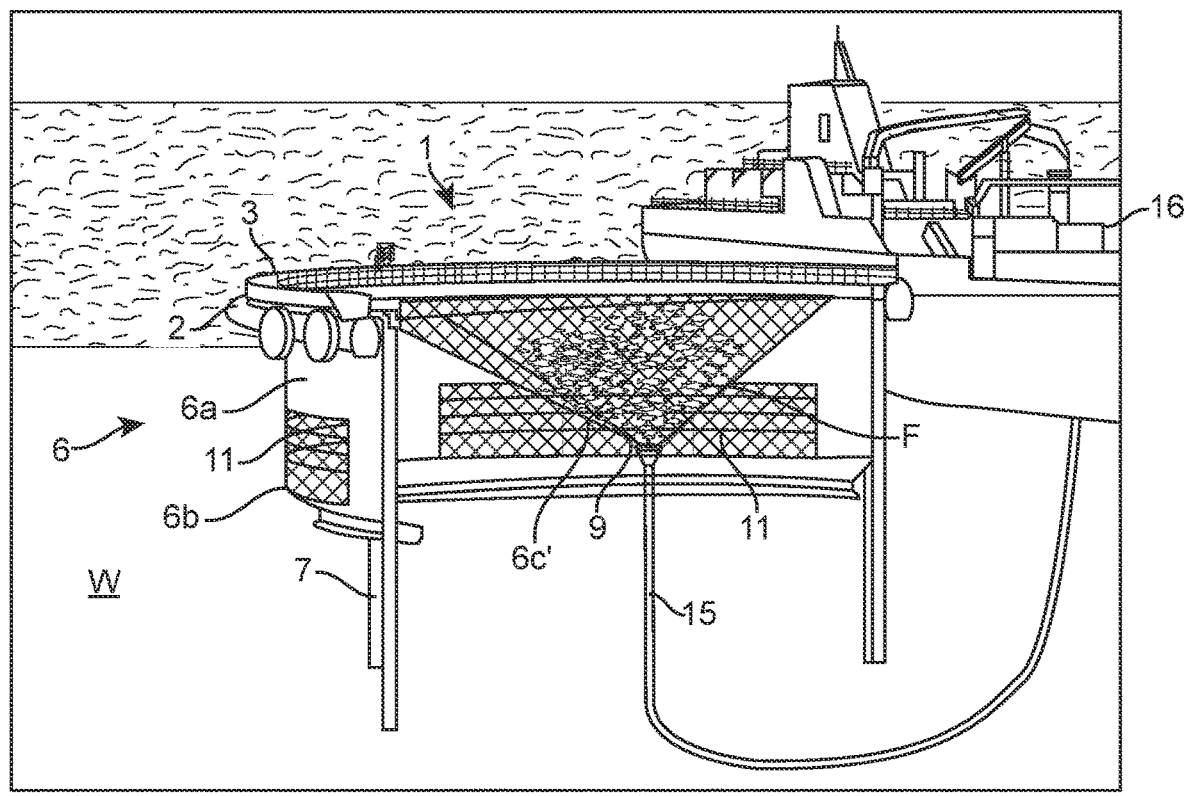
FIG. 8 corresponds to FIG. 7, but the movable lower section of the cage is elevated in the body of water, and the bottom hose is connected to a ship.

FIG. 8 illustrates a situation in which fish is to be transferred (e.g. pumped) from the cage to the wellboat. The movable lower section 6c' has been moved inside the cage middle and upper sections, and raised to the top of the cage, thereby reducing available volume for the fish F, and hence facilitating the process of transferring the fish through the bottom hose 15.

Figure 9:
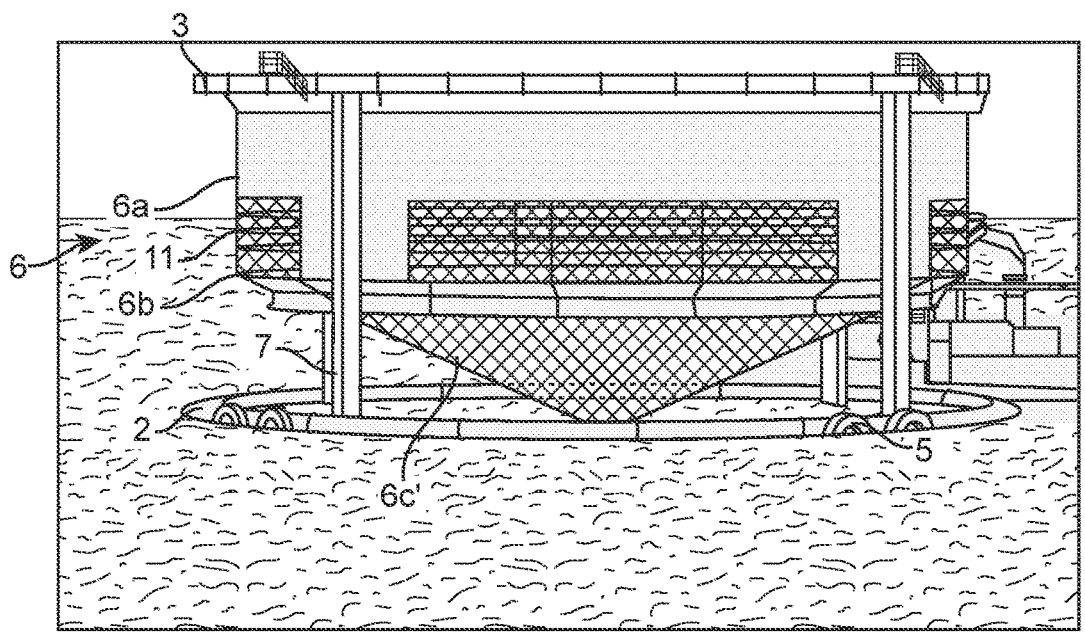
FIG. 9 corresponds to FIG. 7 and FIG. 8, but shows the cage being elevated above the water surface.
Figure 10:
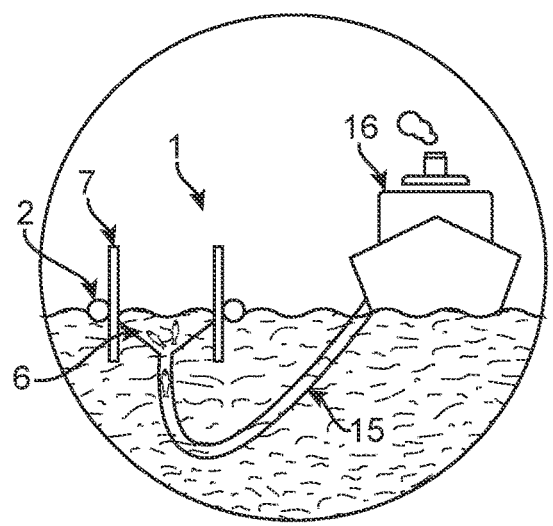
FIG. 10 is a schematic illustration of how the cage in one embodiment may be emptied from the bottom.

FIG. 9 illustrates a disinfection process, in which the entire cage 6 has been elevated above the water surface.

Figure 11:
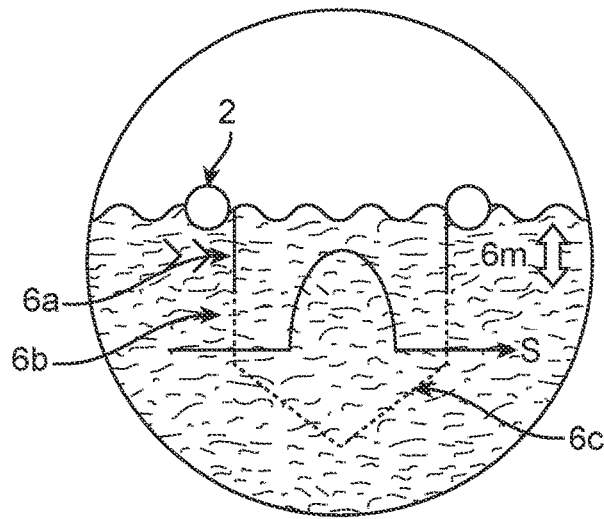
FIG. 11 is a schematic illustration of passive water supply to the cage.
Figure 12:
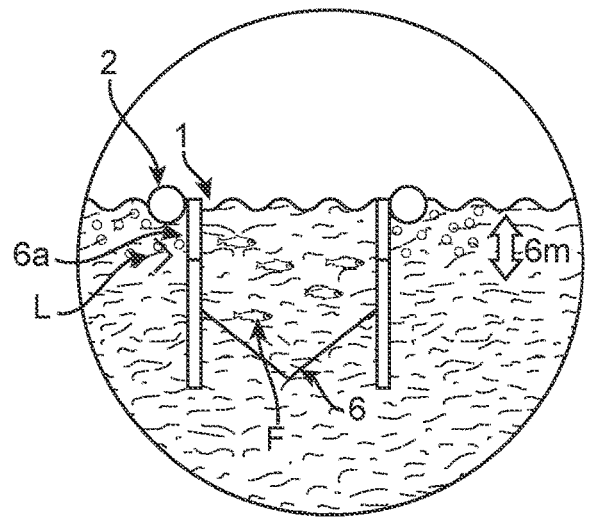
FIG. 12 is a schematic illustration of how the upper, stiff and closed (i.e. continuous and closed surfaces, without openings) structure prevents ingress of lice.
Figure 13:
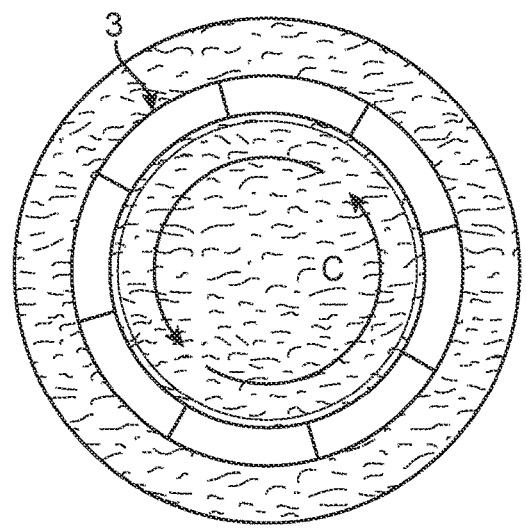
FIG. 13 is a schematic illustration of how the water which is pumped into the cage initiates water circulation inside the cage.
Figure 14:
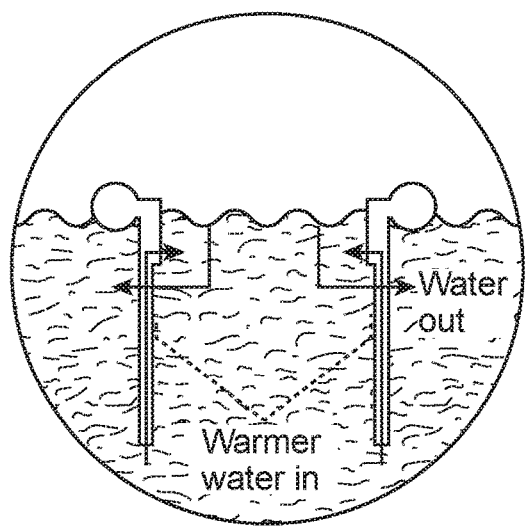
FIG. 14 is a schematic illustration of how water fresh water is pumped into the cage's upper portion, from a region of the cage's lower portion.
Figure 15:
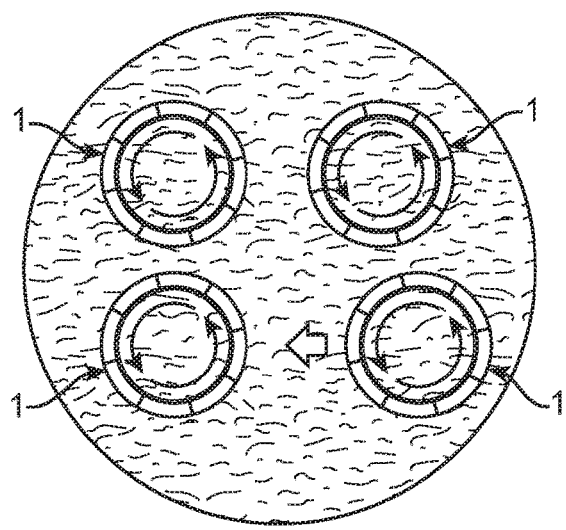
FIG. 15 is a schematic illustration of how multiple plants according to the invention can be placed on existing locations in order to replace the prior art cages.
Figure 16:
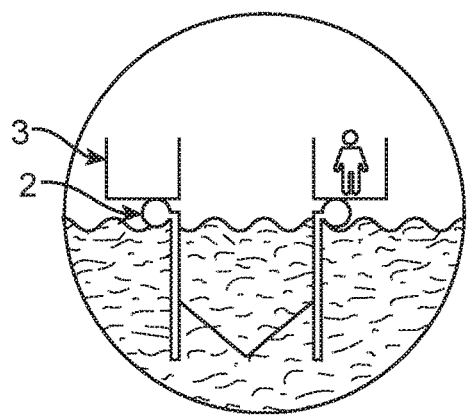
FIG. 16 is a schematic illustration of how the structure is susceptible to little movement (stiff structure) and how the gangway on the buoyant body provides for safe access for personnel.

FIGS. 10-16 are schematic illustrations of how, in various embodiments:

- The cage may be emptied from the bottom (FIG. 10), which provides a gentle handling of the fish and takes advantage of the natural behaviour of the fish.
- Water may be supplied passively to the cage (FIG. 11). Below the cage's upper section 6a (which is closed for horizontal water flow), the cage is open for water flow (but keeps the fish confined inside e.g. in a wire mesh structure). This provides a natural water flow through the lower part of the cage.
- The upper section 6a, which is a stiff and closed (i.e. continuous and closed surfaces, without openings) structure prevents ingress of lice (FIG. 12).
- The water which is pumped into the cage initiates water circulation inside the cage (FIG. 13). This provides a rotary current which will serve to exercise the fish.
- Seawater from outside the cage is pumped into the cage's upper portion (FIG. 14), from a region of the cage's lower portion (through the lifting columns) or below the cage. This results in a steady water temperature in the cage.
- Multiple plants according to the invention can be placed on existing locations in order to replace the prior art cages (FIG. 15).
- The structure is susceptible to little movement (because of its stiff structure) and how the gangway on the buoyancy ring provides for safe access for personnel (FIG. 16).

Figure 17:
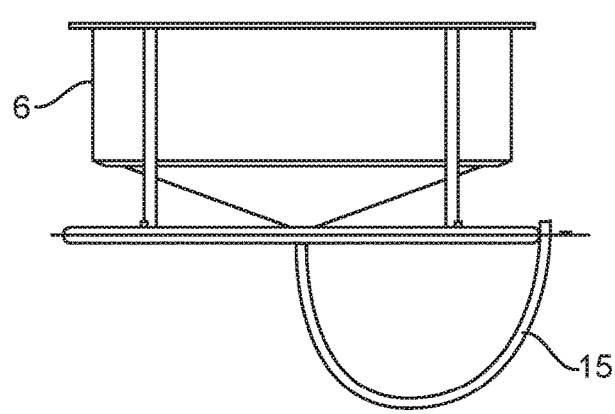
FIG. 17 is a side view of an embodiment of the plant, in a position where the cage is elevated above the buoyant body.
Figure 18:
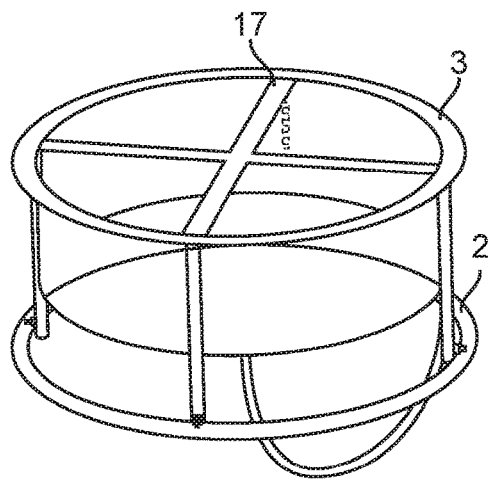
FIG. 18 is a perspective view of the embodiment illustrated in FIG. 17.
Figure 19:
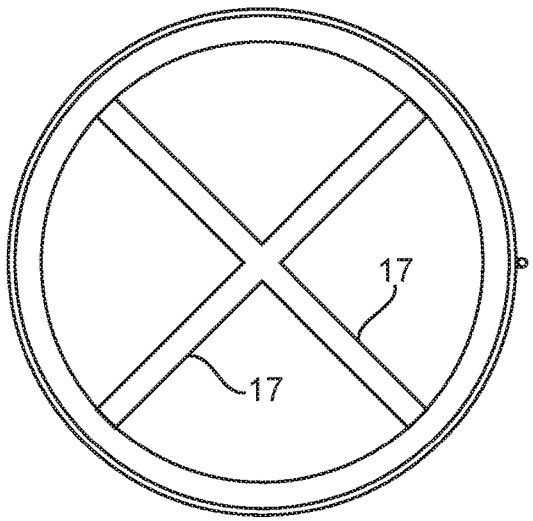
FIG. 19 is a top view of the embodiment illustrated in FIGS. 17 and 18.
Figure 20:
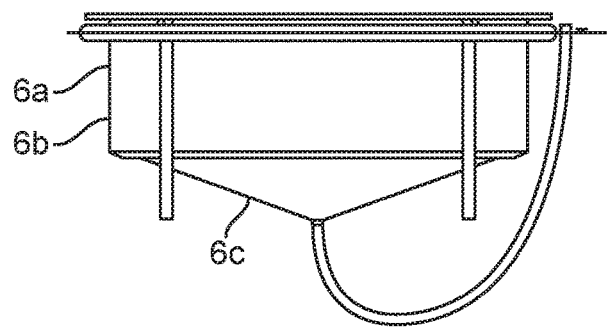
FIG. 20 is a side view of the embodiment illustrated in FIGS. 17-19, but where the cage is lowered to the level of the buoyant body.
Figure 21:
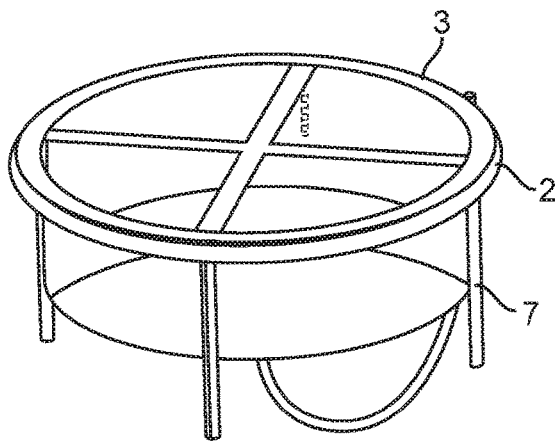
FIG. 21 is a perspective view of the embodiment illustrated in FIG. 20.
Figure 22:
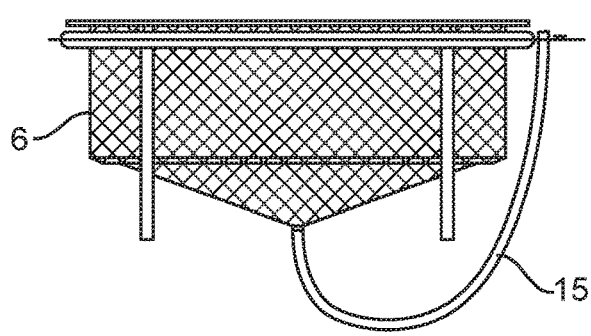
FIG. 22 is a side view of another embodiment of the plant, in a position where the cage is at a level of the buoyant body.
Figure 23:
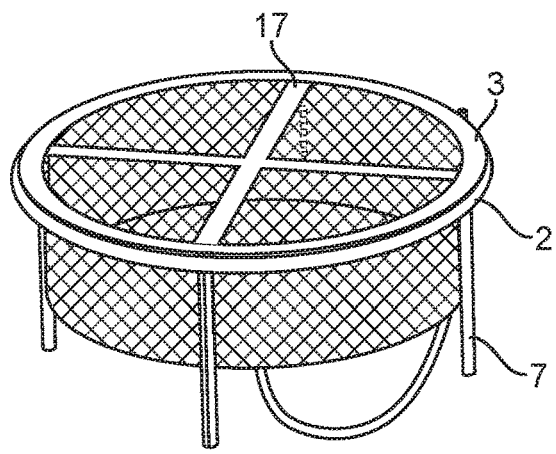
FIG. 23 is a perspective view of the embodiment illustrated in FIG. 22.
Figure 24:
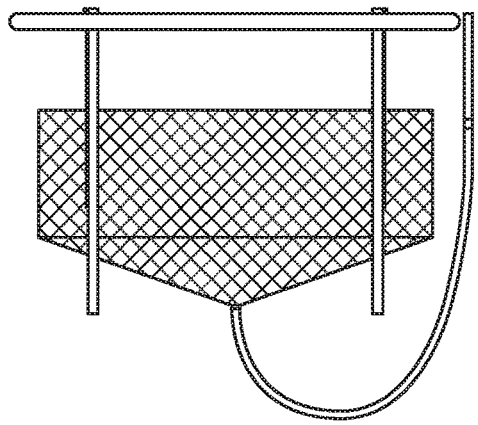
FIG. 24 is a side view of an embodiment of the plant according to the invention, in a position where the cage is lowered below the buoyant body.
Figure 25:
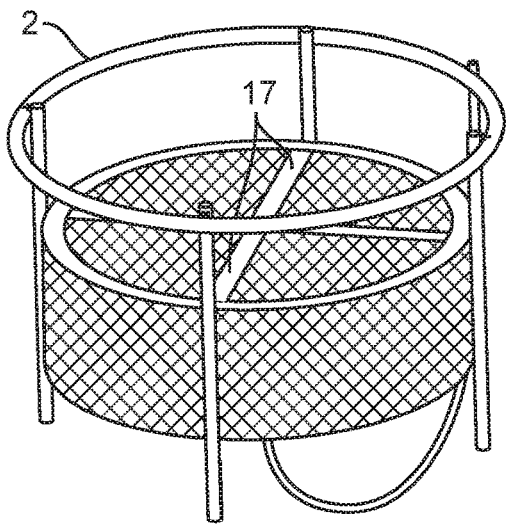
FIG. 25 is a perspective view of the embodiment shown in FIG. 24.
Figure 26:
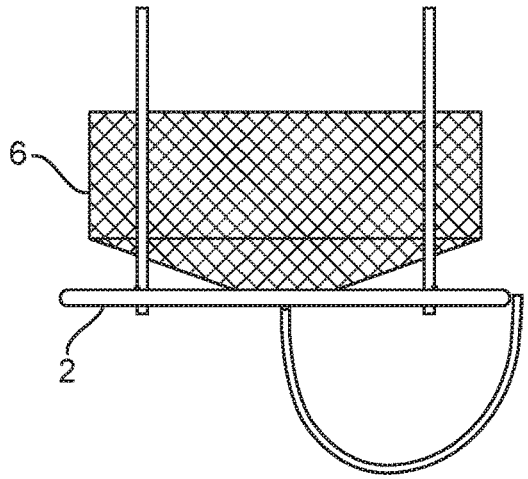
FIG. 26 is a side view of the embodiment shown in FIGS. 24 and 25, in a position where the cage is elevated above the buoyant body.
Figure 27:
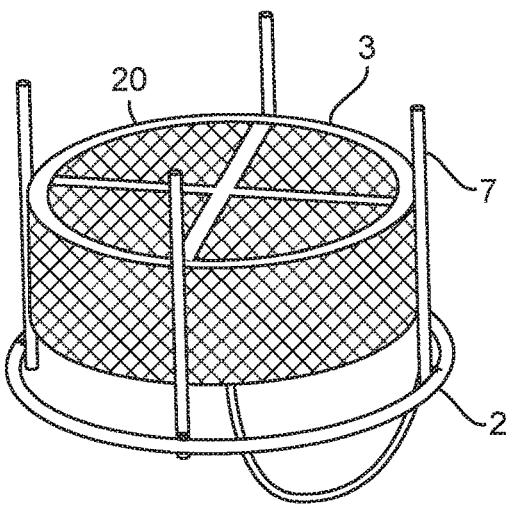
FIG. 27 is a perspective view of the embodiment illustrated in FIG. 26.
Figure 28:
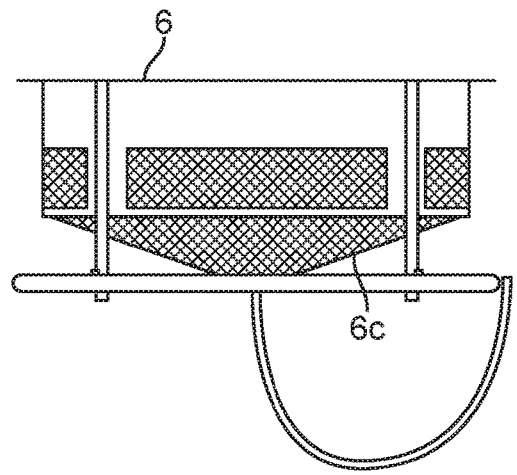
FIG. 28 is a side view of another embodiment of the plant, in a position where the cage is elevated above the buoyant body.
Figure 29:
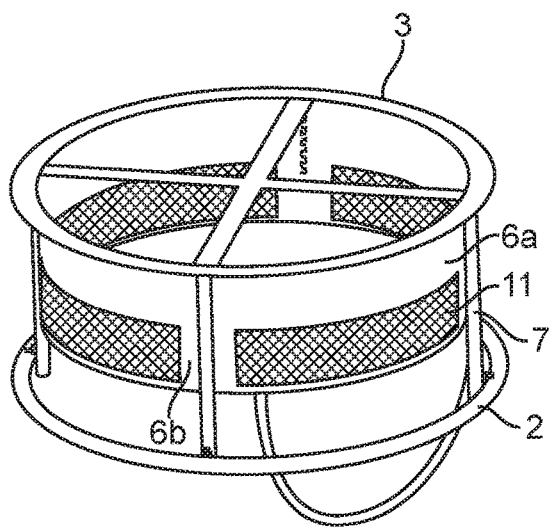
FIG. 29 is a perspective drawing of the embodiment shown in FIG. 28.
Figure 30:
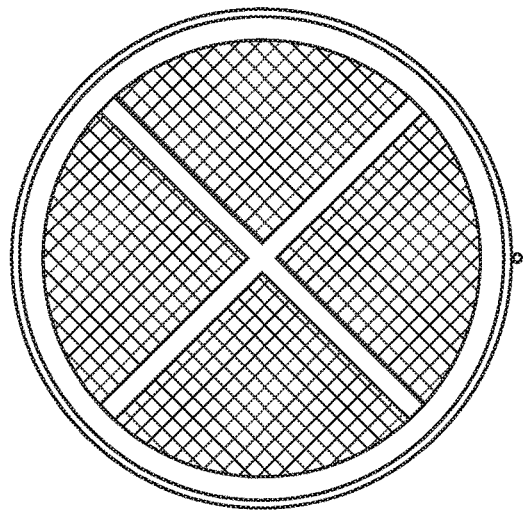
FIG. 30 is a top view of the embodiment illustrated in FIGS. 28 and 29.
Figure 31:
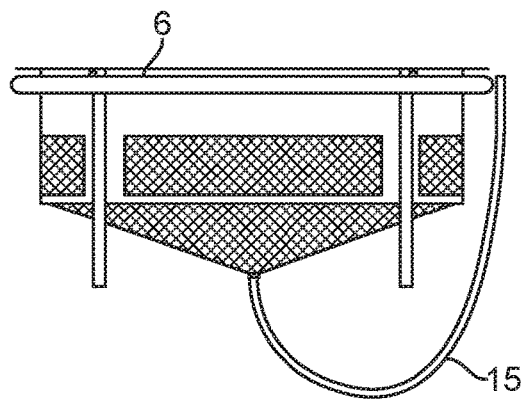
FIG. 31 is a side view of the embodiment illustrated in FIGS. 28-30, in a position where the cage is lowered to a level of the buoyant body.
Figure 32:
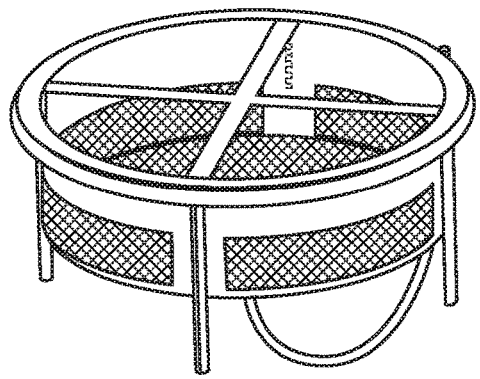
FIG. 32 is a perspective view of the embodiment illustrated in FIG. 31.
Figure 33A:
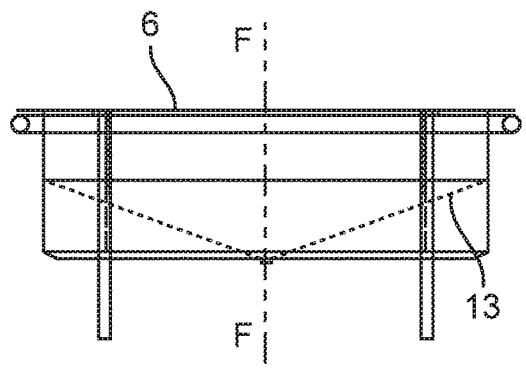
FIG. 33a is schematic side view showing an embodiment of the plant where the cage is lowered to a region of the buoyant body, and the movable lower section is elevated a distance inside the cage.
Figure 33B:
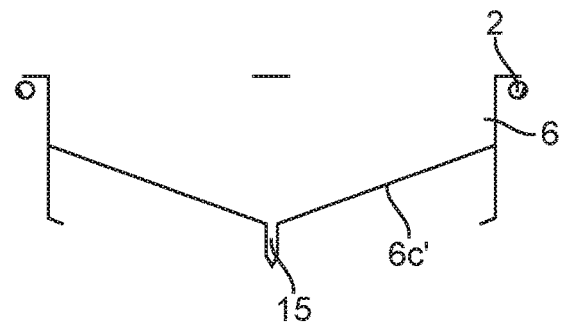
Figure 33C:
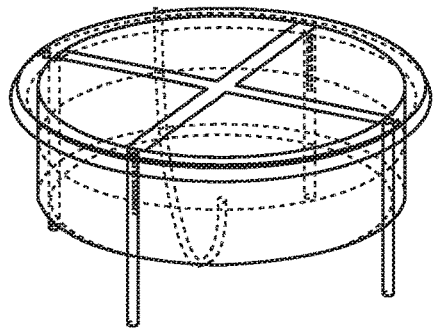
Figure 34A:
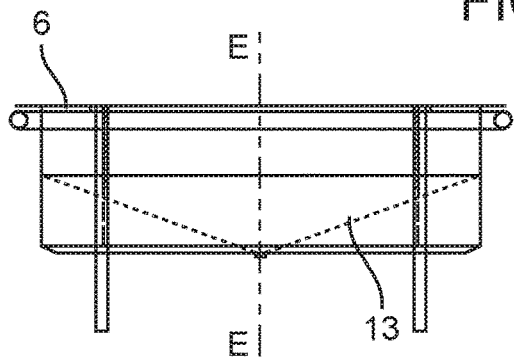
FIG. 34a is a schematic side view showing an embodiment of the plant where the cage is lowered to a region of the buoyancy ring, and the movable lower section is elevated a distance inside the cage.
Figure 34B:
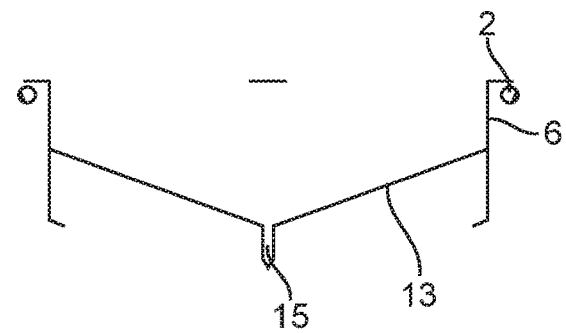
Figure 34C:
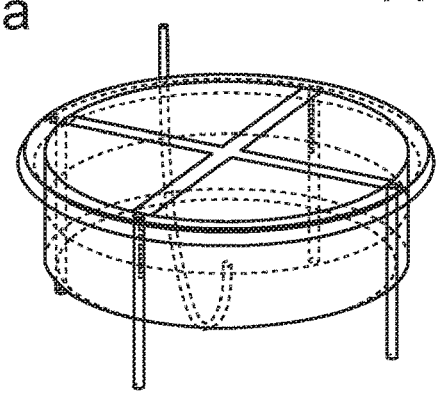

FIGS. 17-21 are illustrations of an embodiment of the floating plant in which the entire cage 6 is of a "closed-wall" configuration, and thus impermeable to water, fish and lice. The upper ring 3, which is connected to the upper section of the cage, is at least partially supported on the lifting columns 7 which terminate on the underside of the upper ring. The upper 6a, middle 6b and lower 6c sections are made of an impermeable and rigid material, such as metal plates. Beams 17 span the cage diameter and are connected to the upper ring 3, thus adding stiffness to the structure. The beams 17 may also form foundations for gangways and access platforms for personnel. The beams 17 may also form a support structure for covering elements (not shown), for example tarpaulins or nets. In FIGS. 17 and 18, the cage 6 is elevated above the buoyancy ring, and in FIGS. 20 and 21, the cage is lowered into the buoyancy ring 2. Although not illustrated in FIGS. 17-21, it should be understood that this embodiment may comprise a movable (liftable) lower section, as described above.

FIGS. 22-27 are illustrations of embodiments of the floating plant in which the entire cage 6 is of an "open-wall" configuration, i.e. in which the walls comprise a rigid structure that allows water to pass through, but is configured and dimensioned such that the farmed fish may not pass through. Suitable structures comprise grating, wire screen and perforated plates. Beams 17 span the cage diameter, thus adding stiffness to the structure. The beams 17 may also form foundations for gangways and access platforms for personnel.

In the embodiment illustrated in FIGS. 24-27, the beams 17 form a support structure for a top cover 20, which in the illustrated embodiment is of a material similar to that of the cage walls. In this embodiment, the lifting columns 7 extend above the top of the cage 6—and hence also above the upper ring 3, whereby the entire cage may be lowered distance below the buoyancy ring 2 (see FIGS. 24 and 25) and hence be submerged a distance below the water surface when the plant is installed in the water. Although not illustrated in FIGS. 22-27, it should be understood that this embodiment may comprise a movable (liftable) lower section, as described above.

FIGS. 28-32 are illustrations of an embodiment of the floating plant in which the cage 6 is of a "semi-open" configuration, similar to the embodiment described above with reference to FIGS. 1 and 2. The upper section 6a comprises an impermeable, cylindrical, wall (of e.g. impermeable plates). The middle section 6b comprises a cylindrical wall with fluid windows 11 which are covered with a stiff structure (e.g. grating, wire screen, perforated plates) that is configured and dimensioned such that water may flow through the window, but prevent the fish from escaping. The lower section 6c comprises a material similar to that of the material in the above-mentioned fluid windows. Although not illustrated in FIGS. 28-32, it should be understood that this embodiment may comprise a movable (liftable) lower section, as described above.

FIGS. 33a-34c illustrate an embodiment of the plant where the movable lower section 6c' is elevated a distance inside the cage 6.

FIGS. 35-38 illustrate an embodiment in which the lower section 6c comprises a suitable elastic material. The upper and middle sections 6a, 6b comprise a "closed-wall" structure. The elastic lower section material may be an "open-wall" structure or a "closed-wall" structure. As discussed above, the term "open" in the context of the section wall, shall mean a wall which comprises a structure that allows water to pass through, but is configured and dimensioned such that the farmed fish may not pass through. Also, the term "closed" in the context of the section wall, shall mean a wall which comprises a structure that is impermeable to water, fish and lice.

Figure 35:
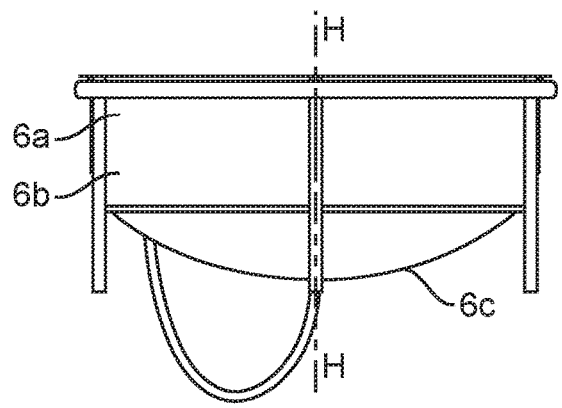
FIG. 35 is a schematic side view of an embodiment of the plant according to the invention, in a position where the cage is lowered to a region of the buoyant body, and where the lower section comprises an elastic wall member, in order to prevent or dampen transfer of dynamic forces from the lower section into the middle and upper sections.
Figure 36:
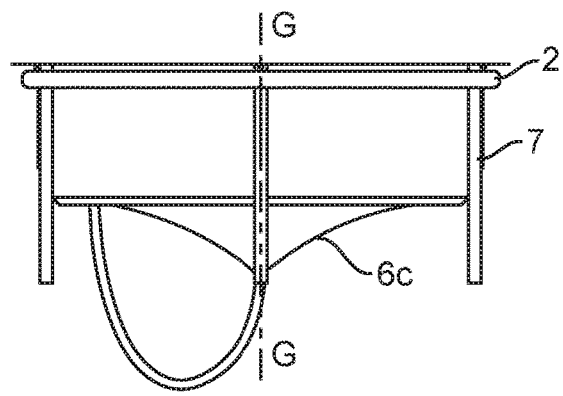
FIG. 36 is a schematic side view of the embodiment illustrated in FIG. 35, showing the elastic lower section in a concave position.
Figure 37:
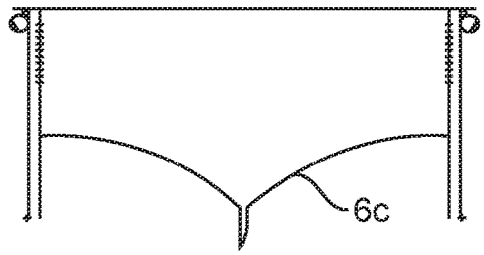
FIG. 37 illustrates the section G-G in FIG. 36.
Figure 38:
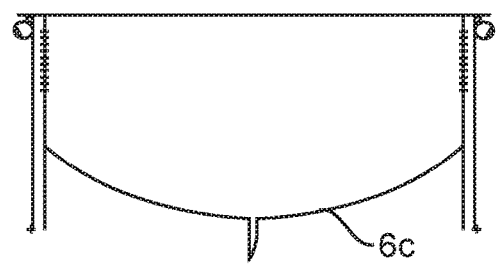
FIG. 38 illustrates the section H-H in FIG. 35.

FIGS. 35 and 38 illustrate a state where the lower section 6c is biased downwards, assuming a convex shape, and FIGS. 36 and 38 illustrate a state in which the lower section is biased upwards. The elastic, or resilient, lower section is able to accommodate for wave motions and water currents, and thus enhance the dynamic stability of the plant.

FIGS. 46a-53 also illustrate embodiments in which the cage lower section 6c comprises an elastic material, corresponding to the embodiment described above with reference to FIGS. 35-38. The upper section 6a comprises a "closed-wall" structure, while the middle section 6b comprises fluid windows 11, as described above. Referring to FIGS. 47, 49, 51 and 53, the lower section 6c—which in the illustrated embodiment comprises a "closed-wall" structure—is movable as described above with reference to FIGS. 6-9 and may be raised to a position approximately halfway up the cage, such that the top of the lower section is between the middle section and the and the upper section. In this position, lower section 6c and the upper section 6a together define a closed volume, and fish inside this closed volume is hence not exposed to lice in the surrounding seawater. This configuration is useful for temporary storage of fish, for example prior to harvesting. This configuration is also useful when administering aquaculture drugs to fish in the cage. One advantage of this cage configuration is that the enclosed cage volume is known, which provides the operator with a good basis for determining a correct drug dosage. As the skilled person will know, a controlled and correct dosage is crucial, for example when administering hydrogen peroxide to combat fish lice, and in general for obtaining the desired health effects. Being able to control the drug dosage is also advantageous from an economical point of view. It should be understood that the lower section may also be elevated all the way to the top of the cage, as described above with reference to FIGS. 6-9.

The elastic material in the lower section prevents, or at least significantly reduces, vertical forces acting on the lower section from being transferred into the middle and upper sections of the cage. It should be understood, therefore, that other cage configurations are conceivable within the ambit of the invention.

Figure 54:
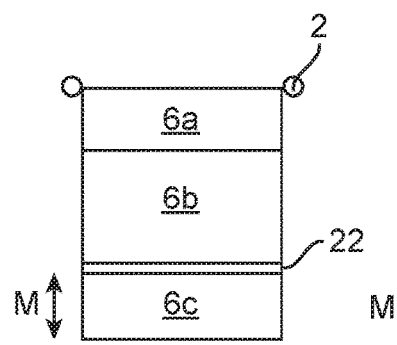
FIG. 54 is a schematic drawing of an alternative embodiment of the invented cage, in which the lower section is connected to the middle section via an elastic connection.
Figure 55:
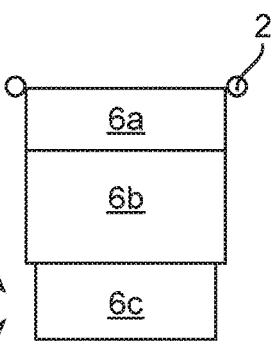
FIG. 55 is a schematic drawing of an alternative embodiment of the invented cage, in which the lower section is telescopically connected to the middle section.

For example, referring to FIG. 54, the lower section 6c may be connected to the middle section 6b via an elastic connection 22, for example a resilient ring member. The arrow M indicate vertical movement of the lower cage, independently of the middle and upper sections 6b, 6a. In FIG. 55, the lower section 6c is telescopically connected to the middle section 6b, whereby the lower section may move up and down with respect to the middle section 6b.

Figure 56:
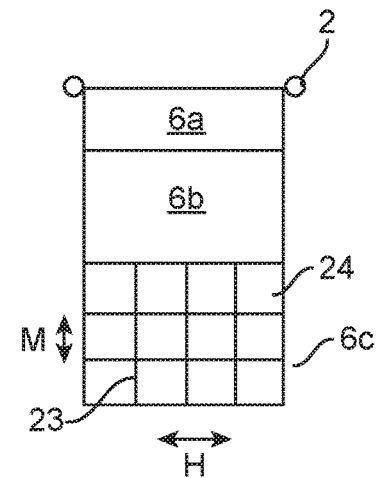
FIG. 56 is a schematic drawing of an alternative embodiment of the invented cage, in which the lower section comprises a plurality of elements, interconnected via elasticise connections and connected to the middle section via an elastic connection.

FIG. 56 illustrates yet another embodiment, in which the lower section 6c comprises a plurality of elements 24 which in themselves may not be elastic, but where the elements 24 are interconnected via elastic connection members 23. The elements 24 may for example be stiff, perforated, plates, or a combined solution with steel nets and a more rigid support at the bottom. This embodiment allows both vertical and horizontal movements of the lower section 6c, as indicated by arrows M, H, relative to the middle and upper sections 6b, 6a.

Thus, it is possible to obtain an elastic (or resilient) connection between the lower section and the rest of the cage, whereby vertical dynamic forces (caused e.g. by waves or currents) acting on the lower section are not transferred into the main structure.

Figure 39:
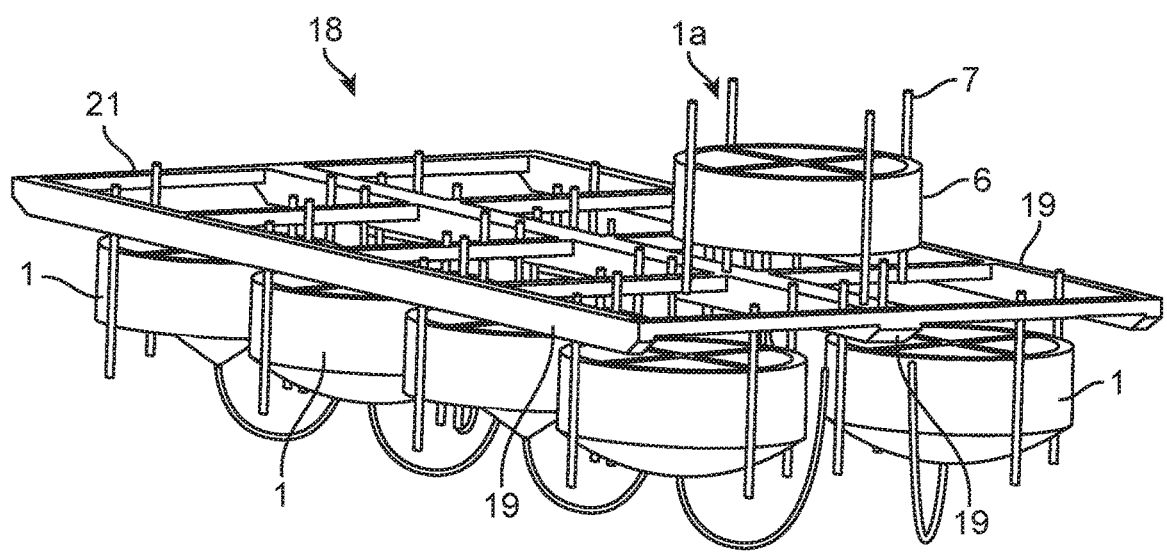
FIG. 39 is a perspective view of an assembly, in which a plurality of plants has been assembled in a structure of three hulls (buoyant bodies). In the figure, the cage of one of the plants 1a has been elevated above the hull/buoyancy element.
Figure 40:
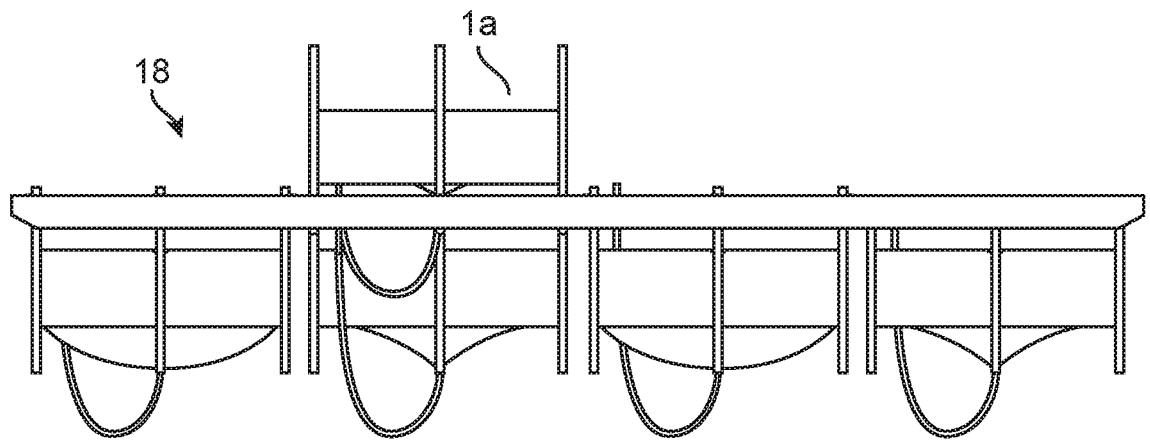
FIG. 40 is a side view of the assembly illustrated in FIG. 39.
Figure 41:
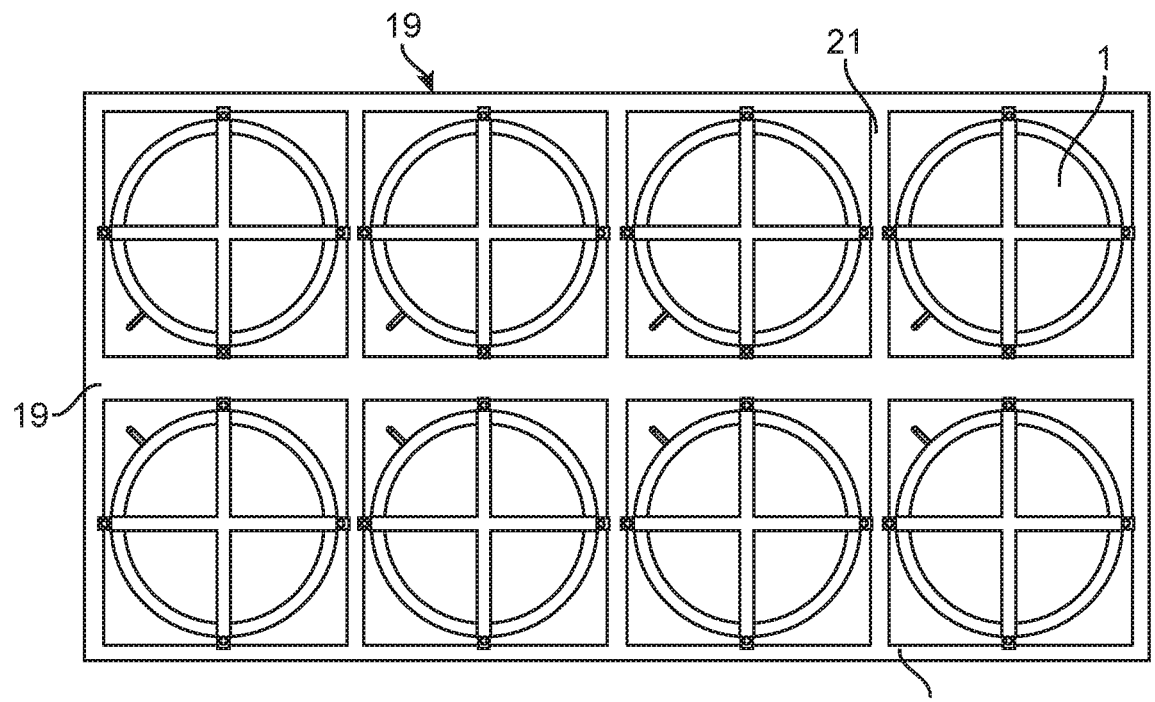
FIG. 41 is a top view of the assembly illustrated in FIGS. 39 and 40.
Figure 42:
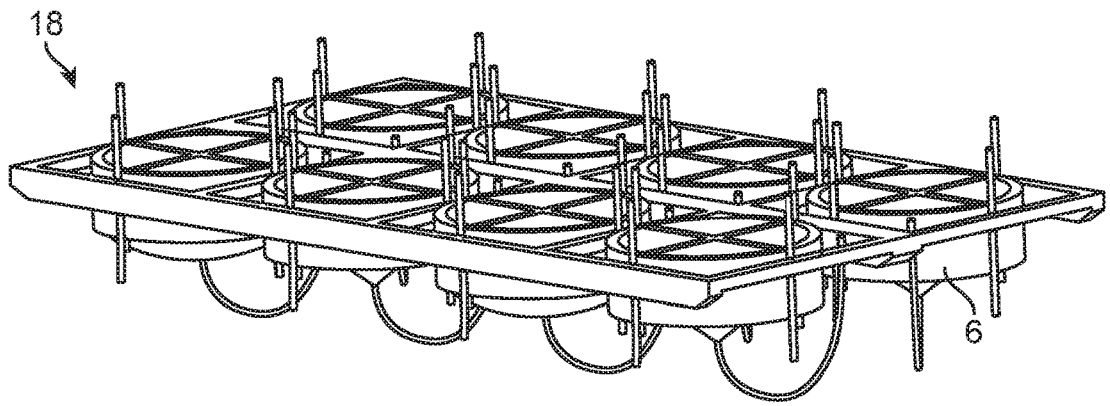
FIGS. 42 and 43 illustrate the assembly shown in FIGS. 39-41, in an operation mode, in which all of the cages are in a lowered position.
Figure 43:
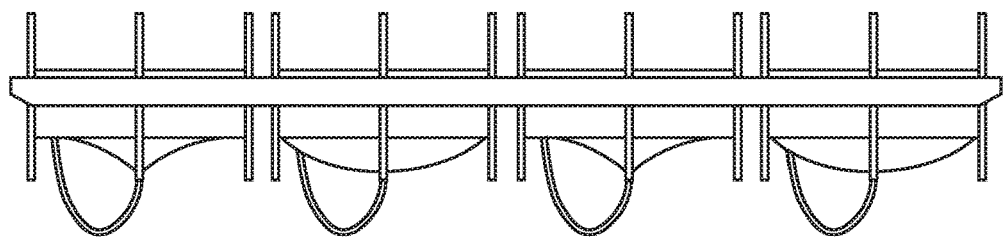
Figure 44:
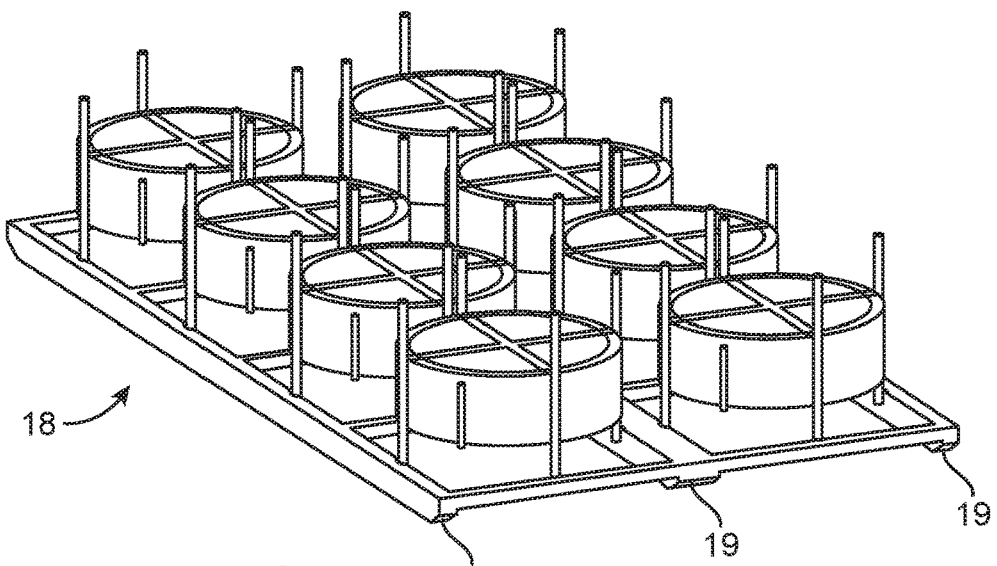
FIGS. 44 and 45 illustrate the assembly shown in FIGS. 39-44, in a transportation mode, in which all of the cages have been elevated above the hulls and the assembly may be transported in the open sea.
Figure 45:
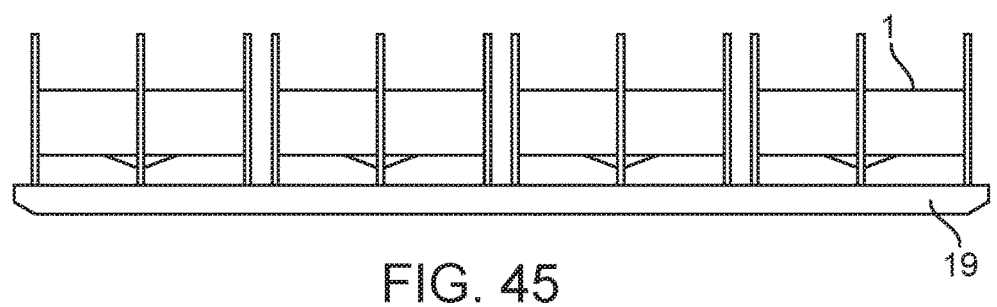
Figure 46A:
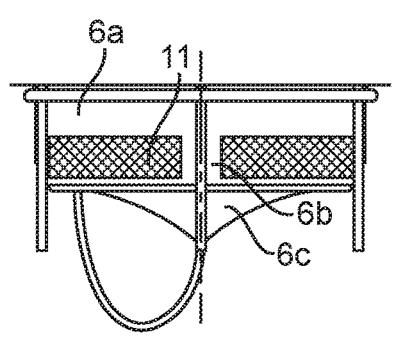
FIG. 46a is a side view of an embodiment of the plant according to the invention, in a position where the cage is lowered to a region of the buoyant body, and where the lower section comprises an elastic wall member, in order to prevent or dampen transfer of dynamic forces from the lower section into the middle and upper sections.
Figure 46B:
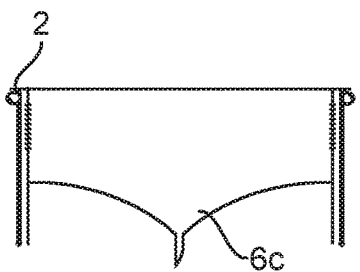
Figure 47:
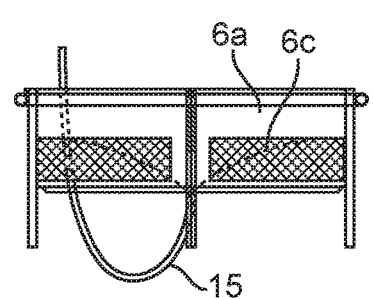
FIG. 47 is a schematic side view of the embodiment illustrated in FIG. 46a, in a state where the elastic lower section has been elevated a distance inside the cage.
Figure 48A:
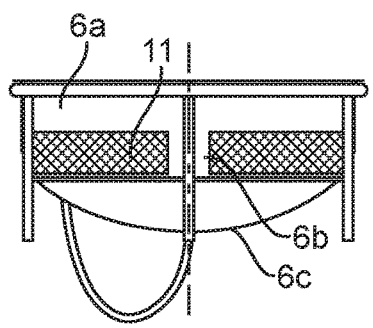
FIG. 48a is a schematic side view of the embodiment illustrated in FIG. 46a, showing the elastic lower section in a convex position.
Figure 48B:
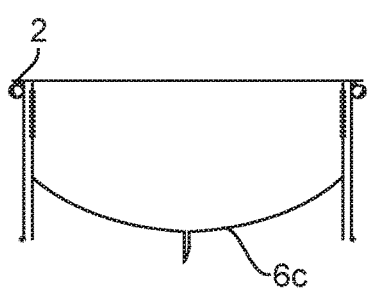
Figure 49:
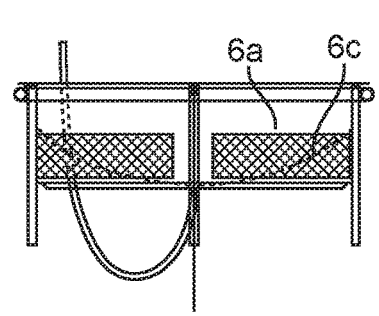
FIG. 49 is a schematic side view of the embodiment and state illustrated in FIG. 48a, in a state where the elastic lower section has been elevated a distance inside the cage.
Figure 50A:
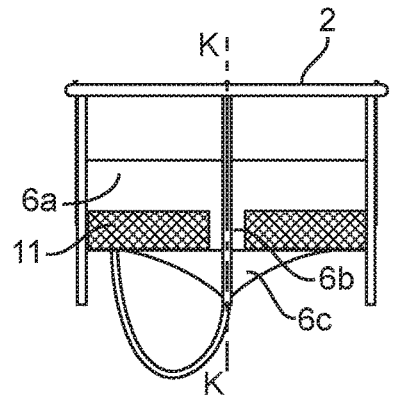
FIG. 50a is a schematic illustration of an embodiment having extended lifting columns, and where the cage is lowered a distance below the buoyant body, and where the lower section comprises an elastic wall member, in order to prevent or dampen transfer of dynamic forces from the lower section into the middle and upper sections.
Figure 50B:
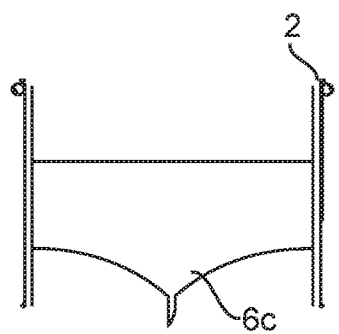
Figure 51:
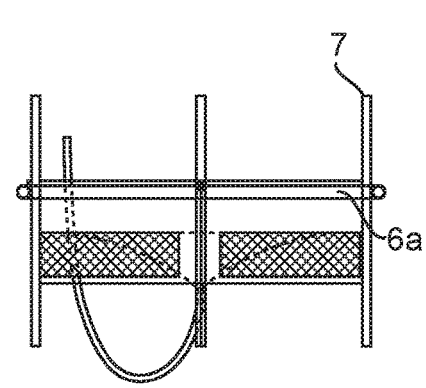
FIG. 51 is a schematic side view of the embodiment illustrated in FIG. 50a, in a state where the cage has been raised to a position where the cage upper end is at the level of the buoyant body, and the elastic lower section has been elevated a distance inside the cage.
Figure 52A:
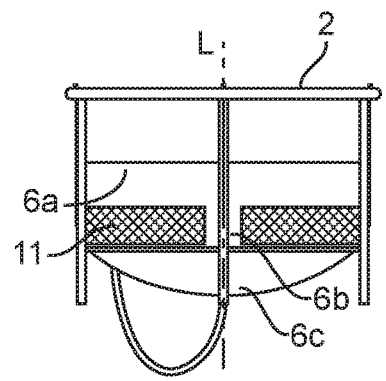
FIGS. 52a, 52b and 53 correspond to FIGS. 50a, 50b and 51, respectively, but show the elastic lower section in a convex position.
Figure 52B:
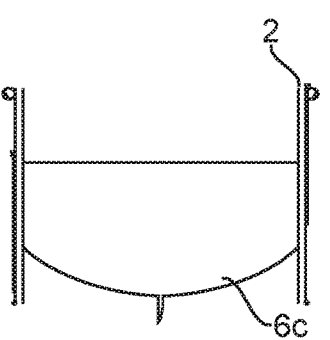
Figure 53:
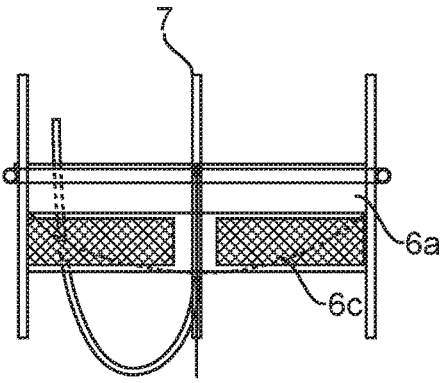

Referring now to FIGS. 39-45 a plurality the invented plant 1, in any one of the embodiments described above, may be combined into an assembly 18. In the illustrated embodiment, the assembly 18 comprises a structure of three hulls (buoyant bodies) 19, interconnected via transverse braces 21. In FIGS. 39 and 40, the cage 6 of one of the plants 1a has been elevated above the hulls 19. In FIGS. 42 and 43, the assembly 18 is in an operation mode, in which all of the cages 6 are in a lowered position, into the water. FIGS. 44 and 45 illustrate the assembly 18 in a transportation mode, in which all of the cages 6 have been elevated above the hulls 19 and the assembly may be transported (e.g. towed) in the open sea.

The invention claimed is:
1. A floating fish farming plant, comprising:
   a closed or semi-closed cage supported by a buoyant body which is configured to float in a body of water; and
   a lifting column arranged between the buoyant body and the cage and configured to move the cage between a position at a level of, or below, the buoyant body and in which at least a portion of the cage is above the buoyant body, wherein the cage further comprises an upper section, a middle section, and a lower section, and wherein:

at least the upper section of the cage is impermeable and rigid;

the cage comprises active circulation of water pumped from deeper down in the body of water; and at least a portion of the lower section is arranged to alter its shape under the influence of external forces to accommodate for wave motions and water currents, and enhance the dynamic stability of the floating fish farming plant.

2. The fish farming plant of claim 1, wherein the lower section is at least partially elastically connected to the middle section of the cage by an elastic connection member between the lower section and the middle section.

3. The fish farming plant of claim 1, said lower section is at least partially elastic.

4. The fish farming plant of claim 2, wherein the lower section is telescopically connected to the middle section.

5. The fish farming plant of claim 2, wherein the lower section comprises a plurality of members interconnected via elastic members.

6. The fish farming plant of claim 1, said lower section being at least partially resilient.

\* \* \* \* \*